(12) United States Patent
Bayer et al.

(10) Patent No.: US 11,380,880 B2
(45) Date of Patent: Jul. 5, 2022

(54) METHOD FOR PRODUCING MOULDED PARTS CONSISTING OF A POROUS MATERIAL IMPREGNATED WITH POLYSULFIDE

(71) Applicant: BASF SE, Ludwigshafen am Rhein (DE)

(72) Inventors: Domnik Bayer, Ludwigshafen (DE); Jesus Enrique Zerpa Unda, Ludwigshafen (DE); Wolfgang Jabczynski, Ludwigshafen (DE); Johan ter Maat, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 16/961,347

(22) PCT Filed: Jan. 10, 2019

(86) PCT No.: PCT/EP2019/050550
§ 371 (c)(1),
(2) Date: Jul. 10, 2020

(87) PCT Pub. No.: WO2019/141580
PCT Pub. Date: Jul. 25, 2019

(65) Prior Publication Data
US 2020/0350552 A1  Nov. 5, 2020

(30) Foreign Application Priority Data

Jan. 16, 2018 (EP) ..................... 18151853

(51) Int. Cl.
*H01M 4/04*  (2006.01)
*H01M 4/58*  (2010.01)
*H01M 10/39*  (2006.01)
*B28B 7/42*  (2006.01)

(52) U.S. Cl.
CPC ........ *H01M 4/0433* (2013.01); *H01M 4/0485* (2013.01); *H01M 4/5815* (2013.01); *H01M 10/3909* (2013.01); *B28B 7/42* (2013.01)

(58) Field of Classification Search
CPC ............. H01M 4/0433; H01M 4/0485; H01M 4/5815; H01M 10/3909
See application file for complete search history.

(56) References Cited

U.S. PATENT DOCUMENTS

| | | | |
|---|---|---|---|
| 3,765,945 A | 10/1973 | Sudworth | |
| 4,084,041 A * | 4/1978 | Ludwig | H01M 10/3909 429/104 |
| 4,360,575 A * | 11/1982 | Brennan | H01M 4/70 429/104 |
| 4,615,957 A * | 10/1986 | Kagawa | H01M 4/661 429/104 |
| 9,034,421 B2 * | 5/2015 | Mikhaylik | H01M 4/139 427/113 |
| 2015/0372291 A1 | 12/2015 | Ryu et al. | |
| 2016/0351970 A1 * | 12/2016 | Durr | H01M 50/46 |
| 2019/0006638 A1 | 1/2019 | Bayer et al. | |

FOREIGN PATENT DOCUMENTS

| | | |
|---|---|---|
| DE | 102015207449 A1 | 12/2015 |
| EP | 0161079 A1 | 11/1985 |
| FR | 2116459 A1 | 7/1972 |
| GA | 2802555 A1 | 12/2011 |
| JP | 2004082461 A | 3/2004 |
| KR | 1020130075495 A | 7/2013 |
| KR | 1020140065758 A | 7/2014 |
| WO | 2011161072 A1 | 12/2011 |
| WO | 2017102697 A1 | 6/2017 |

OTHER PUBLICATIONS

International Search Report for corresponding PCT/EP2019/050550 dated Mar. 26, 2019, 2 pages.

* cited by examiner

*Primary Examiner* — Maria Laios
*Assistant Examiner* — Bartholomew A Hornsby
(74) *Attorney, Agent, or Firm* — Armstrong Teasdale LLP

(57) ABSTRACT

Described herein is a process for the production of moldings made of porous material impregnated with polysulfide, the process including the following steps:
(a) insertion of the porous material into a mold;
(b) introduction of liquid polysulfide into the mold at a flow velocity within the porous material in the range from 0.5 to 200 cm/s;
(c) cooling of the polysulfide to a temperature below the melting point of the polysulfide; and (d) removal of the porous material impregnated with the polysulfide.

14 Claims, No Drawings

METHOD FOR PRODUCING MOULDED PARTS CONSISTING OF A POROUS MATERIAL IMPREGNATED WITH POLYSULFIDE

CROSS-REFERENCE TO RELATED APPLICATIONS

This application is a U.S. National Phase Application of PCT/EP2019/050550, filed Jan. 10, 2019, which claims the benefit of priority to EP Patent Application 18151853.1, filed Jan. 16, 2018, the entire contents of which are hereby incorporated by reference herein.

The invention relates to a process for the production of moldings made of porous material impregnated with polysulfide.

These polysulfide-impregnated moldings are used by way of example as electrodes or electrode parts, or else as storage elements for anode material in the production of electrochemical cells, in particular of sodium-sulfur batteries.

The storage capacity of batteries depends on the quantity present of the reactants used, and additional containers are therefore used in order to increase storage capacity. In sodium-sulfur batteries, discharge is achieved by using the liquid sodium alongside a solid electrolyte that is permeable to cations. The liquid sodium simultaneously serves as anode and forms cations which are transported to the cathode via the cation-conducting solid electrolyte. At the cathode, the sulfur flowing toward the cathode is reduced to polysulfide, i.e. is reacted with sodium ions to give sodium polysulfide. This sodium polysulfide can be collected in another container. Alternatively, it is also possible to collect the sodium polysulfide together with the sulfur in the container around the cathode chamber. Because of the density difference, the sulfur rises and the sodium polysulfide settles. This density difference can also be utilized to bring about flow along the cathode. A corresponding battery design is described by way of example in WO-A 2011/161072 or WO-A 2017/102697.

A general problem in the production of sodium-sulfur batteries is the introduction of the reactants used. In order to permit problem-free operation of the battery, it is necessary to achieve complete sulfur-impregnation of the porous material which surrounds the solid electrolyte and is usually used as cathode. In order to ensure uniform transport of the sulfur during the usual operation of the battery, there is additionally a porous material, usually a felt or a nonwoven fabric, introduced into the space surrounding the electrode and serving as sulfur reservoir. The procedure generally used to introduce materials into the battery introduces liquid sodium into the sodium container and utilizes sulfur-saturated porous electrodes. Processes for the production of sulfur-saturated porous electrodes are described by way of example in JP-A 2004082461, KR-A1020130075495 or KR-A 1020140085758.

A particularly problematic aspect of the introduction of alkali metal and sulfur is the handling of the highly reactive liquid alkali metal, in particular of sodium. WO-A 2017/102697 discloses, with the aim of permitting less dangerous and problematic introduction of materials into the battery, use of polysulfide to impregnate the porous electrode and the porous sulfur-reservoir material, and insertion of the resultant impregnated porous electrode and the impregnated reservoir material into the electrochemical cell. It is then no longer necessary to introduce liquid alkali metal, in particular liquid sodium. In order to convert the electrochemical cell to a condition that is ready for use, an initial post-assembly charging cycle is then carried out in which the alkali metal polysulfide is cleaved to give alkali metal and sulfur, where the alkali metal ions pass through the solid electrolyte, are neutralized by absorbing electrons at the electrode in the anode chamber and are collected and stored in the alkali metal container.

The processes used for a sulfur melt to impregnate the porous materials for the electrode and the reservoir material cannot be used for impregnation with the alkali metal polysulfide, because the properties of the alkali metal polysulfide differ from those of sulfur, in particular in that the former has a higher melting point and, at this temperature, a relatively low viscosity. Furthermore, because the alkali metal polysulfide melt can self-ignite, contact with oxygen must be prevented during the production of the polysulfide-impregnated porous materials, as long as the polysulfide is present in liquid form. Alkali metal polysulfide is moreover hygroscopic, and contact thereof with water, including the water present in the form of atmospheric humidity, must be minimized. It has moreover been found that when high pressure is used to introduce the materials, the structure of the porous material can be altered, or even damaged, by the ingress of the polysulfide.

It was therefore an object of the present invention to provide a process which can produce moldings made of porous material impregnated with polysulfide and which can be operated safely, and without damage to the structure of the porous material.

The object is achieved via a process for the production of moldings made of porous material impregnated with polysulfide, comprising the following steps:

(a) insertion of the porous material into a mold;
(b) introduction of liquid polysulfide into the mold at a flow velocity within the porous material in the range from 0.5 to 200 cm/s;
(c) cooling of the polysulfide to a temperature below the melting point of the polysulfide;
(d) removal of the porous material impregnated with the polysulfide.

Surprisingly, it has been found that when the flow velocity of the polysulfide in the porous material is in the range from 0.5 to 200 cm/s, preferably in the range from 0.5 to 50 cm/s, saturation of the porous material is achieved and the structure of the porous material is not changed in any manner that then prevents operation of the electrochemical cell without performance losses. That type of change occurs when flow velocity is too high, for example through displacement of fibers in a felt or nonwoven fabric that is used as porous material. The displacement changes the pore size within the felt or nonwoven fabric, and this leads to a reduced capillary action, with the result that during discharge there is then insufficient polysulfide transported away from the solid electrolyte and insufficient sulfur transported to the solid electrolyte, and during charging there is insufficient polysulfide transported to the solid electrolyte and insufficient sulfur transported away from the solid electrolyte. Optimal operation of the electrochemical cell requires that during discharge the solid electrolyte is always ideally entirely wetted by sulfur and that the polysulfide is transported away from the solid electrolyte immediately after the reaction of alkali metal with sulfur, and correspondingly requires during charging that the solid electrolyte is always entirely wetted by polysulfide and that the sulfur is transported away from the solid electrolyte immediately after cleavage of the polysulfide to give sulfur and alkali metal. This transport is assisted by the capillary action of the pores in the porous electrode and corresponding wettability of the porous material by polysulfide and, respectively, sulfur.

For the purposes of the present invention, "polysulfide" means the reaction product $X_yS_n$ of anode material X, usually an alkali metal, in particular sodium, and sulfur. n is a number from 1 to 5.2, and gives the average length of the sulfur chains present in the polysulfide; the polysulfide here is frequently a mixture of polysulfides, each with a different number of sulfur atoms per molecule; y is an integer selected in a manner such that the reaction product of anode material and sulfur is electrically neutral. Because the sulfur chains always have a charge of minus two, y =2 by way of example for an alkali metal as anode material X.

In a first step (a) for the production of the porous material impregnated with polysulfide, the porous material is inserted into the mold. The mold here is a conventional mold as used in injection processes or casting processes, and has an interior surface shape corresponding to the exterior shape of the required molding. Because the polysulfide is highly corrosive, all of the mold surfaces that come into contact with polysulfide are made of a material that is inert with respect to the polysulfide. To this end, it is possible to coat the surfaces of the mold or alternatively to manufacture the mold from a material that is inert with respect to the polysulfide and resistant to the temperatures arising. Examples of suitable materials for a coating or for the production of the mold are chromium, glass and ceramics. It is therefore possible by way of example to manufacture the mold from cast iron or from steel, for example from stainless steel or from hardened tool steel, and to provide a chrome coating to same. The chrome coating here is preferably applied electrochemically, i.e. in an electroplating process. If glass or ceramic is used as material for the mold, it is preferable that the latter is manufactured entirely from these materials. Alternatively, it is also possible to apply a thin ceramic coating, for example by a gas-phase deposition process such as CVD. For better demolding of the parts produced, the surfaces that form the shape of the molding are advantageously polished surfaces.

Once the porous material has been inserted, the mold is closed. In order to facilitate the subsequent assembly of the electrochemical cell when the porous material impregnated with polysulfide is used in an electrochemical cell, the internal shape of the mold is designed so that the dimensions of the polysulfide-impregnated porous material produced in the mold permit easy insertion into the electrochemical cell. This means that there is always a small distance between the external surfaces of the resultant polysulfide-impregnated porous material and surfaces with which the impregnated porous material is in contact in the assembled condition of the electrochemical cell. In order that during operation of the electrochemical cell the porous material is in contact with the respective external surfaces, it is moreover preferable that the porous material is somewhat compressed in the mold. After incorporation in the electrochemical cell and melting of the polysulfide, the porous material then expands and comes into contact with the respective external surfaces of the electrochemical cell. The shape of the resultant polysulfide-impregnated porous material, and the compression of the porous material on insertion into the mold, are selected here in a manner that ensures that after relaxation of stresses in the electrochemical cell the porous material is in contact with all contact surfaces in the electrochemical cell. It is therefore preferable that, even after the reversal of deformation in the electrochemical cell, the porous material retains a small degree of compression.

The porous material is compressed in the mold to a volume that is dependent on the use of the porous material in the electrochemical cell and is smaller than the volume of the uncompressed porous material by from 0 to 50%, preferably from 5 to 40% and in particular from 5 to 30%. When the porous material is used as electrode part, it is preferable that the porous material is compressed in the mold to a volume that is smaller than the volume of the uncompressed porous material by from 5 to 50%, more preferably from 10 to 40% and in particular from 20 to 30%. When the porous material is used for reservoir parts, compression is less important, and therefore in this case it is preferable that the porous material is compressed to a volume that is smaller than the volume of the uncompressed porous material by from 0 to 30%, more preferably from 5 to 20% and in particular from 5 to 15%.

Molten polysulfides tend to self-ignite in the presence of oxygen, and it is therefore advantageous that, after insertion of the porous material and after closing, the mold is flushed with an inert gas. Inert gas used here can be any gas that does not react with the polysulfide. Suitable inert gases are in particular nitrogen, carbon dioxide and noble gases. Nitrogen is particularly preferred as inert gas. The flushing with the inert gas removes the gas previously present in the mold, generally air. The oxygen present in the mold is thus also removed, and there is therefore no risk of self-ignition when the polysulfide is introduced into the mold. Additionally or alternatively, it is also possible to apply a reduced pressure in order to remove the air and thus the oxygen from the mold. It is preferable for this purpose to apply a pressure below 100 mbar (abs) to the mold before the polysulfide is introduced. Application of a reduced pressure here has the additional advantage that the transport of the polysulfide into the mold is thus assisted and in particular complete filling of the mold is also permitted, because less pressure is required to compress the gas present in the mold in order to introduce the polysulfide into the mold. It is particularly preferable that the reduced pressure applied to the mold is below 80 mbar (abs) and in particular below 60 mbar (abs).

In order to prevent solidification of the polysulfide on the mold wall during introduction into the mold and entrainment of solidified polysulfide with the melt, with resultant possible damage to the porous material and thus production of defective moldings, the temperature of the mold is preferably in the range from 150 to 350° C. A temperature in this range is sufficient to prevent solidification of polysulfide during introduction into the mold. If, by way of example, a metal casting mold is used for the production of the polysulfide-impregnated porous material, it is possible that this is heated to a temperature above the melting point of the polyamide and is cooled after the material has been introduced.

After the polysulfide has been introduced it is cooled to a temperature below the melting point. In order to avoid shrinkage and thus to produce moldings corresponding to the desired geometric requirements, it is preferable that, during cooling, further polysulfide is introduced under pressure into the mold. In order to permit the polysulfide in the mold to solidify, it is necessary that the temperature of the mold is below the melting point of the polysulfide. On the other hand, however, in order to avoid excessively rapid solidification of the polysulfide, which would inhibit or prevent introduction of further material intended to ensure that the shape of the molding is as desired, or which could cause damage to the porous material, it is also necessary that the temperature of the mold is not excessively low. A mold temperature in the range from 150 to 350° C. is also advantageous for introducing further material in order to achieve the desired shape.

The mold temperature here means the temperature at the surfaces that come into contact with the polysulfide. An example of a method for controlling the temperature of the mold is provision of electrical heating or alternatively formation, in the mold, of channels through which a temperature-control medium flows, for example steam or hot fluid.

In order both to avoid excessively rapid solidification during the introduction of the polysulfide into the mold and also to permit introduction of further material to order to achieve the desired shape, the mold temperature, i.e. the temperature of the mold surfaces coming into contact with the polysulfide, is preferably in the range from 150 to 350° C., more preferably in the range from 150 to 250° C. and in particular in the range from 170 to 230° C.

In order to prevent further deformation of the resultant molding made of polysulfide-impregnated porous material after removal from the mold, all of the polysulfide introduced into the mold has advantageously solidified before the mold is opened for the removal of the molding. This is achieved in that the mold remains closed for from 10 to 300 s after the introduction of the polysulfide, preferably from 30 to 180 s, in particular from 60 to 120 s. This time in particular depends on the temperature of the mold, the temperature of the melt, and the size of the resultant molding made of polysulfide-impregnated porous material. The higher the temperature of the mold and the larger the molding, the longer the required retention time of the molding in the mold after introduction of the polysulfide into the mold has been concluded and before the mold can be opened to remove the molding.

Contact of the polysulfide in the molten state with oxygen must be avoided, because the polysulfide can self-ignite, and it is therefore preferable that the polysulfide in solid form is introduced into a feed container. After introduction of the polysulfide, said container is inertized, for example by flushing with an inert gas. Inert gases that can be used here are the gases described above for the flushing of the mold. It is preferable to use argon to inertize the container. Alternatively or additionally, it is also possible to evacuate the container after the polysulfide has been introduced and after it has been closed. After inertization, the container is heated to a temperature above the melting point of the polysulfide, so that the polysulfide in the container melts. If the polysulfide is sodium polysulfide as is usually used in electrochemical cells operating on the basis of sodium as anode material and sulfur as cathode material, the container is heated to a temperature above 285° C., preferably to a temperature of from 285 to 350° C., so that the temperature of the polysulfide after melting is likewise in the range from 285 to 350° C. In order to accelerate the melting of the polysulfide, the temperature during the melting procedure is advantageously above 285° C. The greater the temperature difference between the melting point of the polyamide and the temperature of the container, the greater the heat flux that can be introduced to melt the polysulfide.

The feed container is then connected to the mold by way of a suitable connecting line. Before the connection from the feed container into the connecting line is opened, for example via a valve at the outlet of the feed container, it is advantageous to inertize the connecting line, for example as described above by flushing with an inert gas and/or by evacuation. In this type of setup where the feed container is connected to the mold by way of a connecting line, there is the possibility of easy change of the feed container once the polysulfide has been consumed. In this case it is possible to melt the polysulfide in a feed container not connected to the mold, and a feed container filled with molten polysulfide is attached to the connecting line. This permits production of the moldings made of polysulfide-filled porous material without the long interruptions which would be required if, on each occasion after the polysulfide had been consumed, it were necessary to introduce fresh polysulfide into the feed container, inertize same, and then melt the polysulfide. Alternatively, it is also possible to introduce further polysulfide regularly into the feed container, or to provide an inertized container in which solid polysulfide has previously been introduced and, with use of metering equipment, for example a rotary valve, connect said container to the feed container for the molten polysulfide, and thus meter further solid polysulfide into the feed container for the liquid polysulfide either when a lower threshold quantity is reached or else alternatively continuously; the solid polysulfide in the feed container here is melted in the liquid polysulfide already present therein.

For the possibility of changeover of the feed container, it is advantageous to leave polysulfide in the connecting line. This allows operation to continue without fresh inertization of the connecting line after the changeover of the feed container. Because in this case it is necessary to close the ends of the connecting line on account of the risk of self-ignition, the only requirement is then to inertize the part between the valve at the outlet of the feed container and the valve on the connecting line at the end at which the connecting line is attached to the feed container. In order to ensure that the polysulfide cannot solidify in the connecting line, it is preferable to provide trace heating to the latter, an example being a heating wire, or a jacket through which a temperature-control medium flows. It is also necessary to insulate the connecting line in order to avoid overheating.

The polysulfide is introduced in the form of melt into the mold. The melting point is by way of example in the range from 235 to 285° C. when sodium polysulfide is used. The temperature at which the sodium polysulfide is introduced into the mold is preferably in the range from 285 to 350° C. and in particular in the range from 300 to 330° C.

Because the polysulfide shrinks during solidification, it is necessary during cooling to force further polysulfide into the mold. The magnitude of the pressure used for this purpose must also be sufficient to cause onward movement, at locations of the molding that are remote from the point of injection, of polysulfide used for shrinkage-compensation. This permits production of moldings of precisely correct shape. This is in particular necessary in order to permit easy assembly of the electrochemical cell. Because the requirement to avoid deformation of the porous material also applies during the introduction of further material, the pressure used to introduce the polysulfide after filling of the mold is preferably in the range from 150 to 200 bar. This pressure allows production of moldings of precisely correct shape without deformation of the porous material.

Various casting processes can be used to introduce the polysulfide into the mold. It is preferable that the polysulfide is introduced into the mold by a cold-chamber process, a hot-chamber process or a vacuum casting process.

In the case of the cold-chamber process, the polysulfide is heated in an oven and melted, conveyed from the oven into a conveying unit which can generate a superatmospheric pressure in the mold, and forced by the conveying unit into the mold. The hot-chamber process differs from this in that the conveying unit which forces the polysulfide into the mold is part of the oven. In particular, a piston unit is used as conveying unit which can generate the superatmospheric pressure in the mold. This type of piston unit comprises a compression chamber into which the polysulfide flows from the feed container or from the oven, and a piston which, in a subsequent step, forces the polysulfide from the compression chamber into the mold. However, it is also possible to use any other suitable conveying unit as alternative to this type of piston unit, an example being a pump or else a reciprocating-screw machine. However, particular preference is given to a piston unit.

The vacuum casting process differs from the cold-chamber process and hot-chamber process in that the polysulfide is not forced into the mold by a conveying unit. A reduced pressure is applied at the mold and the molten polysulfide flows into the mold by virtue of the reduced pressure applied at same.

It is particularly preferable to combine the vacuum casting process with the hot-chamber process or with the cold-chamber process. Application of the reduced pressure in particular avoids the possibility of inclusion of gas into the molding, leading to incomplete impregnation of the porous material, or of surface deformation caused by gas bubbles in the mold, because the gas is removed from the mold before the polysulfide is introduced. An example of a possibility here is that initially polysulfide is introduced into the mold solely by virtue of the reduced pressure applied, and that the conveying unit is used only for the introduction of further material, but another possibility is that the conveying unit is used from the beginning to assist introduction of the polysulfide into the mold. In every case, however, it is necessary to ensure that the flow velocity of the polysulfide in the porous material is in the range from 0.5 to 200 cm/s, preferably in the range from 0.5 to 50 cm/s and in particular in the range from 1 to 10 cm/s.

The molding made of polysulfide-impregnated porous material is in particular an electrode or part of an electrode for an electrochemical cell, or else a storage element for use in an electrochemical cell, in particular for a sodium-sulfur battery.

An electrochemical cell in which the moldings made of polysulfide-impregnated porous material can be used generally comprises a cathode chamber intended to hold a liquid cathode material and an anode chamber intended to hold a liquid anode material, where a solid electrolyte separates the cathode chamber from the anode chamber and the solid electrolyte is enclosed by a sheet material with apertures through which the cathode material can flow. The sheet material has been manufactured from an electrically conductive material, and the cathode chamber comprises at least one segment, where each segment has a jacket made of an electrically conductive material and the jacket has been secured on the sheet material with apertures in a manner that provides electrical conductivity. If the cathode chamber comprises more than one segment, the connection of the jacket to the sheet material with apertures must moreover be impermeable to fluids. The respective segments serve as reservoir for the cathode material and, in order to increase the storage capacity of the electrochemical cell, it is possible to increase either the number of segments or the cross-sectional area, and thus the volume, of the segments. In order that the cathode material is conducted uniformly to the solid electrolyte and that the reaction product formed at the solid electrolyte from anode material and cathode material is conducted away from the solid electrolyte, a porous material is inserted into the segments. Capillary forces in the pores of the porous material assist transport of the cathode material and, respectively, of the reaction product. In order to avoid handling of the reactive starting materials, in particular highly reactive alkali metal used as anode material, during production of the electrochemical cell, the porous material is impregnated with the polysulfide and then, in the form of molding made of polysulfide-impregnated porous material, is inserted into the segments. A corresponding electrochemical cell and production thereof are described by way of example in WO-A 2017/102697. By virtue of the use of the moldings made of polysulfide-impregnated porous material, instead of introduction of cathode material and of anode material, the electrochemical cell is in discharged condition after assembly. In order to permit use of the electrochemical cell, it is therefore first necessary to charge same. To this end, the electrochemical cell is first heated so that the polysulfide melts. An electrical current is then applied to the electrochemical cell, and the polysulfide is thus cleaved at the solid electrolyte to give cathode material and anode material. The anode material passes through the solid electrolyte and is collected in the anode chamber. The cathode material remains in the porous material in the cathode chamber.

It is also possible, alternatively or additionally, to provide an electrode made of a porous material, the arrangement of this electrode being on that side of the solid electrolyte that faces toward the cathode chamber. It is preferable here that the electrode made of porous material encloses the solid electrolyte.

When the molding made of polysulfide-impregnated porous material is used in an electrochemical cell, it is particularly preferable to use, as polysulfide, an alkali metal polysulfide. It is particular preferable that the alkali metal polysulfide is sodium polysulfide.

The material for the porous material is selected as required by the function of the molding made of polysulfide-impregnated porous material. If the porous material is intended for use as porous electrode in the electrochemical cell, the material used for the porous material is one that is chemically inert and electrically conductive and that can be wetted both by sulfur and by polysulfide. The porous material in this case is preferably composed of carbon, in particular in the form of graphite.

In a possible method for improving the transport of material in the porous electrode it is possible to use, in addition to the chemically inert and electrically conductive material that can be wetted by the cathode material, a second material, which does not necessarily have to be electrically conductive, but which can easily be wetted by the reaction product of cathode material and anode material. Particularly suitable materials that can easily be wetted by the reaction product of cathode material and anode material are oxide ceramics or glasses, for example aluminum oxide ($Al_2O_3$), silicon dioxide, for example glass fibers, mixed oxides of aluminum with silicon, with silicates and with aluminosilicates, and also zirconium oxide and mixtures of these materials. When a material that can easily be wetted by the reaction product of anode material and cathode material is also present, the proportion, in the electrode, of the material that can easily be wetted by the reaction product of cathode material and anode material is preferably less than 50% by volume, particularly preferably less than 40% by volume and at least 5% by volume. It is moreover possible to use a thermal treatment to render the electrode wettable for the reaction product of anode material and cathode material. A thermal treatment can by way of example be carried out at 600° C. in air for from 20 to 240 minutes.

When the molding made of polysulfide-impregnated porous material is used as storage material in the cathode chamber, the porous material is preferably one manufactured from a material that can easily be wetted by the cathode material and by the reaction product of cathode material and anode material. In order to obtain good wetting of the porous material even when cathode material and reaction product have different wetting properties, it is advantageous to manufacture the porous material from different materials, where a portion of the material can easily be wetted by the cathode material and a portion can easily be wetted by the anode material. When a mixture of a plurality of different materials is used for the porous material, it is preferable that each of these is used in the same proportion by volume. However, it is also possible to set other ratios by volume as required by the design of the electrochemical cell. When an alkali metal is used as anode material and sulfur is used as cathode material, suitable materials of which the porous material is composed are in particular thermally stabilized polymer fibers, fibers made of oxide ceramics or glass fibers, preferably thermally stabilized polymer fibers in a mixture with fibers made of oxide ceramics or glass fibers. Suitable fibers made of oxide ceramics or glass fibers are in particular fibers made of aluminum oxide ($Al_2O_3$), silicon dioxide, for example glass fibers, mixed oxides of aluminum with silicon, with silicates or with aluminosilicates, zirconium oxide and mixtures of these materials. Examples of suitable thermally stabilized polymer fibers are oxidized, thermally stabilized polyacrylonitrile (PAN) fibers which are available commercially by way of example as PANOX®. In order to render these fibers more resistant to temperatures above 300° C., the polymer fibers in a mixture with the oxide ceramic fibers or glass fibers are advantageously posttreated by way of example for from 12 to 36 hours at temperatures in the range from 400 to 500° C. in an inert atmosphere, for example nitrogen or noble gas such as argon.

In order that uniform transport of cathode material and reaction product of cathode material and anode material toward the electrode and away from the electrode can be ensured when the porous material is used in an electrochemical cell, in particular in a sodium-sulfur battery, it is preferable that the porous material is a felt, a woven fabric, a knitted fabric, a braided fabric, a nonwoven fabric, an open-pore foam or a three-dimensional network. If the porous material is a felt, a preferential direction is provided thereto in order to improve mass transport during the operation of the electrochemical cell. The preferential direction can in particular be produced here via needling. The preferential direction here preferably runs perpendicularly in relation to the solid electrolyte after assembly of the electrochemical cell. Alternatively or additionally, it is possible to provide channel-type structures in order to improve mass transport. These likewise preferably run perpendicularly in relation to the solid electrolyte in an assembled electrochemical cell.

In order, when a porous material has a preferential direction, to make good use of the preferential direction during the production of the molding made of polysulfide and of porous material, and in order to facilitate impregnation with the polysulfide, the arrangement of the injection point by way of which the polysulfide is introduced into the mold is advantageously such that when the polysulfide is introduced into the mold it flows along the preferential direction in the porous material. Deformation of the porous material during the introduction of the polysulfide into the mold is thus in particular further reduced or prevented.

Once the polysulfide has been introduced, this is cooled until it solidifies. The molding made of polysulfide-impregnated porous material is thus formed. The molding is also dimensionally stable by virtue of the solidified polysulfide, and therefore cannot be deformed and thus can easily be used in the production of the electrochemical cell. Easy deformation of the porous material is possible again only when the polysulfide has been remelted. Another advantage of production from polysulfide-impregnated porous material is that the molding can be handled safely, because the polysulfide is susceptible to self-ignition only in the molten state, and no self-ignition takes place when the polysulfide is in solid form, even in the presence of oxygen.

In order to achieve safe production of a plurality of moldings made of polysulfide-impregnated porous material, it is therefore necessary, after opening of the mold and removal of the molding, and after the mold has again been closed, to re-inertize the mold before the polysulfide is introduced. As long as, before the polysulfide is introduced, the mold is inertized as described above, for example by flushing with an inert gas or, alternatively or additionally, by applying a reduced pressure, the process can also be operated safely for production of a plurality of moldings.

Another possibility alongside the use of mold systems having only one mold to produce a molding is use of mold systems having a plurality of molds each connected to one another via flow channels, or connected by way of a distribution system to a central polysulfide supply, the aim being thus to permit simultaneous production, in one mold system, of a plurality of moldings made of polysulfide-impregnated porous material. It is preferable in this case to connect the individual molds of the mold system by way of a distribution system with a central supply, so that polysulfide is simultaneously introduced via the central supply system, by way of the distribution system, into the individual molds.

What is claimed is:

1. A process for the production of moldings made of porous material impregnated with polysulfide, comprising the following steps:
    (a) insertion of the porous material into a mold;
    (b) introduction of liquid polysulfide into the mold at a flow velocity within the porous material in the range from 0.5 to 200 cm/s;
    (c) cooling of the polysulfide to a temperature below the melting point of the polysulfide; and
    (d) removal of the porous material impregnated with the polysulfide, wherein after filling of the mold and during cooling, a pressure is applied to introduce further polysulfide into the mold.

2. The process according to claim 1, wherein after the insertion of the porous material the mold is flushed with an inert gas.

3. The process according to claim 1, wherein, before the introduction of the polysulfide, a pressure below 100 mbar (abs) is applied to the mold.

4. The process according to claim 1, wherein the temperature of the mold is in the range from 150 to 350° C.

5. The process according to claim 1, wherein the temperature of the polysulfide when it is introduced into the mold is in the range from 285 to 350° C.

6. The process according to claim 1, wherein the pressure for introducing further polysulfide in step (c) is in a range from 150 to 200 bar.

7. The process according to claim 1, wherein introduction of the polysulfide into the mold is achieved by using a cold-chamber process, a hot-chamber process or a vacuum casting process.

8. The process according to claim 1, wherein the polysulfide is an alkali metal polysulfide.

9. The process according to claim 8, wherein the polysulfide is sodium polysulfide.

10. The process according to claim 1, wherein the porous material is a felt, a woven fabric, a knitted fabric, a braided fabric, a nonwoven fabric, an open-pore foam or a three-dimensional network.

11. The process according to claim 1, wherein the porous material is composed of graphite, of heat-stabilized polymer fibers, of fibers made of oxide ceramic, of glass fibers or of a mixture thereof.

12. The process according to claim 1, wherein the molding is an electrode or a part of an electrode for an electrochemical cell.

13. The process according to claim 1, wherein the molding is a storage element for use in an electrochemical cell.

14. The process according to claim 12, wherein the electrochemical cell is a sodium-sulfur battery.

\* \* \* \* \*